Figure 1:
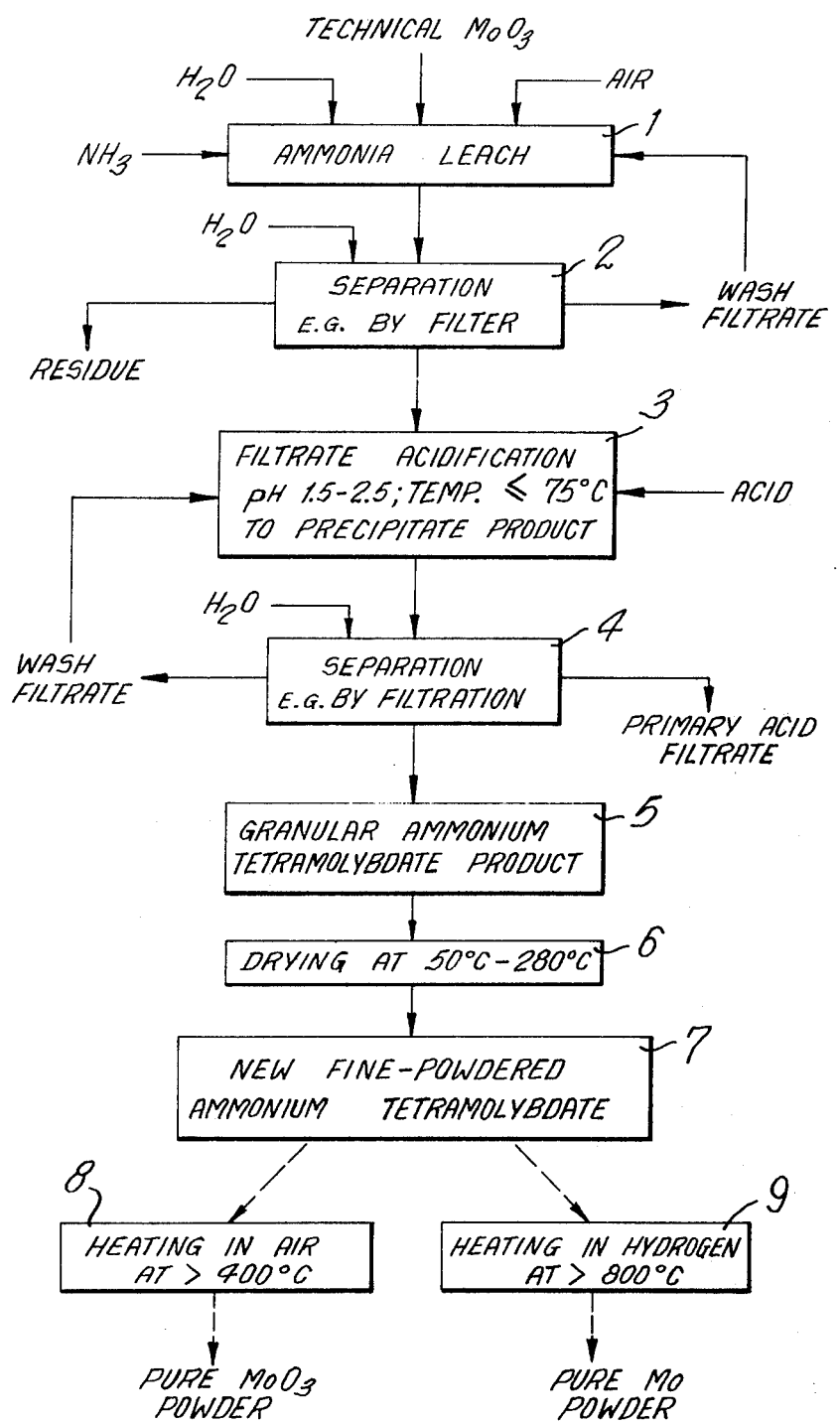

United States Patent [19]

Stanley

[11] 3,899,284
[45] Aug. 12, 1975

[54] FORM OF AMMONIUM TETRAMOLYBDATE AND METHOD OF PREPARATION

[75] Inventor: Robert W. Stanley, Kirkland, Canada

[73] Assignee: Noranda Mines Limited, Toronto, Canada

[22] Filed: Aug. 10, 1973

[21] Appl. No.: 387,500

[30] Foreign Application Priority Data
Apr. 19, 1973 Canada.................................. 170022

[52] U.S. Cl. .................... 423/593; 75/5 A; 423/606
[51] Int. Cl. ............................................ C01g 39/00
[58] Field of Search .............. 423/593, 606; 75/.5 A

[56] References Cited
UNITED STATES PATENTS

| | | | |
|---|---|---|---|
| 3,156,556 | 11/1964 | Meddings et al. ................... | 75/.5 A |
| 3,510,291 | 5/1970 | Brush.............................. | 423/606 X |

FOREIGN PATENTS OR APPLICATIONS

| | | | |
|---|---|---|---|
| 1,268,595 | 6/1961 | France.............................. | 423/593 |
| 216,677 | 8/1965 | U.S.S.R.............................. | 423/593 |

OTHER PUBLICATIONS

Lindquist, "Acta Chemica Scand.," Vol. 4, 1950, pp. 551–552.
Lindquist (2), "Chemical Abstracts," Vol. 45, 1951, p. 490(g).
Hansson et al., "Acta Chemica Scand.," Vol. 3, 1949, pp. 1430–1436.

Primary Examiner—Herbert T. Carter
Attorney, Agent, or Firm—Finnegan, Henderson, Farabow and Garrett

[57] ABSTRACT

A new form of ammonium tetramolybdate is obtained by subjecting technical grade molybdic oxide to ammonia leach, then removing the residue from the leach to obtain an ammonium molybdate solution and acidifying the solution at a temperature of up to about 75°C to a pH of about 1.5–2.5 to precipitate a granular ammonium tetramolybdate product, then separating this granular product from the acidified solution and drying it at a temperature of between about 50°C and 280°C to obtain the new form of ammonium tetramolybdate. This new product is a fine powder having an X-ray diffraction pattern with peaks, by order of importance, at 6.20 Angstroms, 8.14 Angstroms, 7.24 Angstroms, 3.61 Angstroms and 7.37 Angstroms. It is a valuable intermediate in the manufacture of pure molybdic oxide and of high quality molybdenum metal powder.

20 Claims, 2 Drawing Figures

( DEGREES 2 θ )

FORM OF AMMONIUM TETRAMOLYBDATE AND METHOD OF PREPARATION

This invention provides a new form of ammonium tetramolybdate and includes a process of producing this compound as well as methods of its transformation into pure molybdic oxide and high quality molybdenum powder.

Several forms of ammonium tetramolybdate are already known in the art. They are usually identified by their X-ray diffraction patterns and by their termal decomposition mechanisms. For example, in French Pat. No. 1,268,595 of June 23, 1960, issued to Manufactures de Produits Chimiques du Nord Etablissements KUHLMANN, three such forms of ammonium tetramolybdate are described and identified by their X-ray diffraction patterns and one of them is claimed as new.

We have now found another new form of ammonium tetramolybdate which is a valuable intermediate in the preparation of high purity molybdic oxide and high quality molybdenum powder.

The new annomium tetramolybdate has a natural physical form of a fine white powder. Its bulk density is generally in the range of 0.75–0.90 g./c.c. and its tap density is in the range of 1.25–1.50 g./c.c.

A typical chemical analysis of this product is as follows:

| | | |
|---|---|---|
| Mo | 60.659 ± 0.05 | % by weight |
| NH$_3$ (calculated as NH$_4^+$) | 5.6 ± 0.1 | % by weight |
| Al | 0.0005 | % by weight |
| Ca | 0.0005 | % by weight |
| Cr | 0.0004 | % by weight |
| Cu | 0.0001 | % by weight |
| Fe | 0.0005 | % by weight |
| Mg | 0.0001 | % by weight |
| Ni | 0.0005 | % by weight |
| Pb | 0.0005 | % by weight |
| Si | 0.0010 | % by weight |
| Sn | 0.0004 | % by weight |
| Ti | 0.0003 | % by weight |

This analysis and particularly the impurities may vary slightly depending on the purity and composition of the original material from which this compound is obtained and depending on certain process conditions used during its preparation. For the above reasons, we do not wish to be limited to the specific analysis mentioned above. It should be noted, however, that the typical analysis given above illustrates the high purity of the obtained product. It should also be noted that the remainder of the chemical compostion, up to 100 percent, essentially consists of oxygen and water of hydration.

The X-ray diffraction pattern of the new ammonium tetramolybdate, which is the most appropriate way of characterizing this product, is as follows:

| dA Angstroms | I/I' Relative Intensities of the Peaks |
|---|---|
| 9.13 | 15 |
| 8.50 | 13 |
| 8.14 | 48 |
| 7.37 | 37 |
| 7.24 | 43 |
| 6.96 | 25 |
| 6.20 | 100 |

-Continued

| dA Angstroms | I/I' Relative Intensities of the Peaks |
|---|---|
| 5.47 | 7 |
| 4.79 | 6 |
| 4.69 | 6 |
| 3.71 | 6 |
| 3.61 | 42 |
| 3.47 | 17 |
| 3.35 | 13 |
| 3.26 | 23 |
| 3.20 | 11 |
| 3.08 | 27 |
| 3.01 | 14 |
| 2.95 | 8 |
| 2.71 | 7 |
| 2.41 | 6 |
| 2.31 | 6 |
| 2.15 | 13 |

The most intense peaks, by order of importance, are therefore at 6.20 Angstroms, 8.14 Angstroms, 7.24 Angstroms, 3.61 Angstroms and 7.37 Angstroms.

This pattern has been determined by the Difractometer (Flat Powder) Method, using CuKα as source of radiation, with nickel filter at 40 KV and 20 mA. This difractometer method is well known in the art of determining X-ray diffraction patterns and does not require further explanation.

The thermal decomposition mechanism of the new ammonium tetramolybdate in air as determined by thermogravimetric analysis is as follows (heating rate 200°C/hr.):

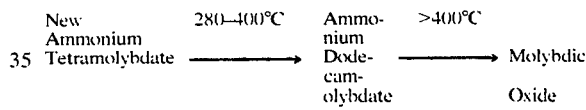

This means that when heating in air within the range of 280°–400°C at a heating rate of about 200°C/hr., there will be a transformation of the tetramolybdate into dodecamolybdate and in the range above 400°C there will be a transformation of the dodecamolybdate into molybdic oxide. In other words, molybdic oxide is obtained from the new ammonium tetramolybdate through the intermediary of ammonium dodecamolybdate.

All these characteristics clearly point to a new compound which, to applicant's knowledge, has not been previously identified.

Such fine-powdered ammonium tetramolybdate can be prepared by the following process:

a. subjecting technical grade molybdic oxide to ammonia leach;

b. removing residue from the leach to obtain an ammonium molybdate solution;

c. acidifying said solution at a temperature of up to 75°C to a pH of about 1.5–2.5 to precipitate a granular ammonium tetramolybdate product;

d. separating said granular product from the acidified solution; and e. drying said granular porduct at a temperature of between about 50°C and 280°C to produce the fine-powdered ammonium tetramolybdate compound.

The ammonia leach is a well known operation and it is unnecessary to discuss it in great detail. In the present case, however, the preferred ammonia leach is performed at a temperature of about 50°–60°C at about 25–30 percent solids and with a mole ratio of $NH_3/Mo$ of about 2.0–2.5. The ammonium hydroxide solution will also have a strength which is at least sufficient for stoichiometric reaction with the Mo values present therein. Preferably, there will be a slight excess over the stoichiometric quantity.

It should also be noted that the ammonia leach should preferably be carried out with injection of air or with addition of hydrogen peroxide, or both, in order to convert any ferrous iron which may be present in the technical grade molybdic oxide into ferric iron. In this regard, ferric iron is insoluble as it does not dissolve in the solution to any significant extent. It is precipitated as ferric hydroxide and removed from the ammonium molybdate solution together with other insoluble gangue constituents by filtration. On the other hand, ferrous iron, resulting from incomplete oxydation, during roasting of the molybdenite concentrate, is soluble in the solution and remains as an impurtiy. It is therefore highly undesirable to have ferrrous iron in the solution and an injection of air or intorduction or hydrogen peroxide in a controlled amount such as to convert the ferrous iron to ferric iron can easily be effected. When hydrogen peroxide is added for this purpose, its amount should be controlled so as to convert the ferrous iron into ferric iron but without the formation of peroxy molybdates. A man of the art will have no difficulty in controlling the introduction of air or addition of hydrogen peroxide in such a manner.

The residue from the leach may be easily removed by filtration through a filter and then simply discarded. The filter may be washed with purified water and the resulting wash water may be recycled to the next ammonia leach.

The filtrate which is basically an ammonium molybdate solution, is then acidified, preferably by addition of a mineral acid, at a temperature of up to about 75°C and preferably of between 25°–75°C to a pH of about 1.5–2.5, while agitating said solution. Hydrochloric and nitric acids are preferred for effecting this operation. The preferred pH range is between 1.5 and 1.9.

This acidification of the ammonium molybdate solution obtained from the ammonia leach is a very important step in the formation of the new ammonium tetramolybdate. The pH must be maintained essentially between 1.5 and 2.5 and the temperature should not exceed about 75°C. Preferably, the higher the pH the lower the temperature.

This controlled acidification will produce a precipitate which is readily separated, for example, by filtration, and which consists of a granular ammonium tetramolybdate product. The precipitated product may also be washed with purified water to remove entrained mother liquor and the wash water may be recycled to the next acidification stage.

The obtained granular ammonium tetramolybdate product is rather unstable in nature and it is preferred to separate it as quickly as possible from the acidified solution and upon separation to dry it immediately at a temperature of between 50° and 280°C to produce the new fine powdered ammonium tetramolybdate of the present invention. This fine powdered product has been found to have an average particle size of between about 2 and 5$\mu$ although no grinding nor any other treatment, except the drying at 50° to 280°C, of the granular ammonium tetramolybdate has taken place. The particle size in this instance and in all other instances mentioned hereinafter has been determined by the Fisher Sub-Sieve Sizer using a sample weight of 4.60 grams.

The granular ammonium tetramolybdate product which is obtained as an intermediate in this process is also believed to be a new compound but it is unstable in nature and is of no particular interest except in its transformation into the new fine powdered ammonium tetramolybdate. It has also been found that the instability of this granular product increases with increased precipitation temperature and it is for this reason that temperatures above about 75°C are not recommended during acidification of the ammonium molybdate solution. It should be noted that this granular ammonium tetramolybdate product may be directly heated at a temperature of above 400°C to form pure $MoO_3$ powder, however, this simply means that the granular ammonium tetramolybdate product will first be decomposed into the new fine powdered ammonium tetramolybdate and the latter will then be decomposed into pure $MoO_3$ in a single continuous operation.

Consequently, although the granular ammonium tetramolybdate product may be a new compound, it is of no particular interest to us because of its instability and granulometry and it is simply dried at a temperature of 50° to 280°C to form the new fine powdered ammonium tetramolybdate of the present invention. It is clear that the drying operation transforms completely the crystalline structure of the granular unstable ammonium tetramolybdate product into a fine-powdered stable ammonium tetramolybdate material.

It should also be noted that due to the unstable character of the granular ammonium tetramolybdate product, it may well happen that a small portion thereof will become partially decomposed or modified before it is transformed into the final fine-powdered ammonium tetramolybdate. This is particularly apt to happen in an industrial batch operation where, due to the large quantity of the material involved, it may take several hours to effect separation of the granular material from the acid solution and additional time may lapse before it is subjected to the drying operation at a temperature between 50° and 280°C to form the final fine-powdered ammonium tetramolybdate. Under such circumstances the final ammonium tetramolybdate product may not have the same X-ray diffraction pattern as specified previously because a portion thereof will not consist of our new compound. However, it has been found that so long as this final product is in the form of a suitable fine powder, it is satisfactory for the purposes intended, namely transformation into pure $MoO_3$ or pure, high quality molybedenum powder. The small portion of the granular ammonium tetramolybdate which is modified during the above-mentioned time lapse consists of other forms of ammonium tetramolybdate because the $Mo/NH_3$ ratio in the final product does not change and only its diffraction pattern is affected. It has been clearly determined, however, that when the granular intermediate ammonium tetramolybdate compound is filtered rapidly from the acid solution (within about 20–30 min. of its formation) and then immediately dried as described above, it will result in the new fine-powdered ammonium tetramolybdate product with reproducible X-ray diffraction pattern as identified above. However, if this granular compound is filtered and washed during a period of about 3–4 hours before it is subjected to drying, it will still usually produce an acceptable fine-powdered final product but which will have a different X-ray diffraction pattern because it will consist of an admixture of the new ammonium tetramolybdate with minor quantities of other forms of ammonium tetramolybdate.

This new fine-powdered ammonium tetramolybdate, along or in admixture with minor quantities of other forms of ammonium tetramolybdate as described above, is eminently suitable for transformation into pure $MoO_3$ powder or pure, high quality molybdenum powder of similar particle size. The new fine-powdered material is therefore a commercial product by itself. It can be produced and sold to others who will simply transform it either into pure $MoO_3$ or pure molybdenum powder, as desired.

Its transformation into pure $MoO_3$ is easily achieved by heating in air at a temperature of above 400°C. It should be noted, however, that this transformation is not direct and there will be an intermediary formation of ammonium dodecamolybdate which will start at a temperature of about 280°–300°C. Then, above 400°C the ammonium dodecamolybdate will be transformed into pure molybdic oxide.

The new fine-powdered ammonium tetramolybdate product may also be transformed directly into pure molybdenum powder by heating in hydrogen at a temperature above 800°C.

This transformation again is not believed to be a direct reduction from the new ammonium tetromolybdate into pure molybdenum powder, but rather a two-stage reduction with the intermediary formation of $MoO_2$ which will start at a temperature of about 550°C followed by formation of Mo at a temperature above 800°C.

It should be noted, however, that these intermediary formations are not important and the applicant does not restrict his invention thereto. The fact is that the new fine-powdered ammonium tetramolybdate can be readily transformed into pure $MoO_3$ or pure Mo powder by simple heating at specified temperatures in an air or hydrogen atmosphere respectively, without any additional treatments. Both obtained products are of high purity and high quality, having a desirable particle size of between about 2 and $5\mu$ as determined by the Fisher Sub-Sieve Sizer.

Pure molybdic oxide is, of course, a well known product in the art; it can be used for many applications such as catalysts in hydrocracking, hydrogenation, oxidation, polymerization, reforming and other reactions as well as an intermediate for the preparation of heteropoly acids and molybdenum metal powder. The molybdenum metal powder is of course suitable for the production of molybdenum sheets having good ductility and other improved properties such as drawing and malleability. It has been found that molybdenum powder produced from the new type of ammonium tetramolybdate of the present invention having an average particle size of between 2 and $5\mu$ is particularly suitable for transformation into excellent molybdenum sheet material.

Figure 2:
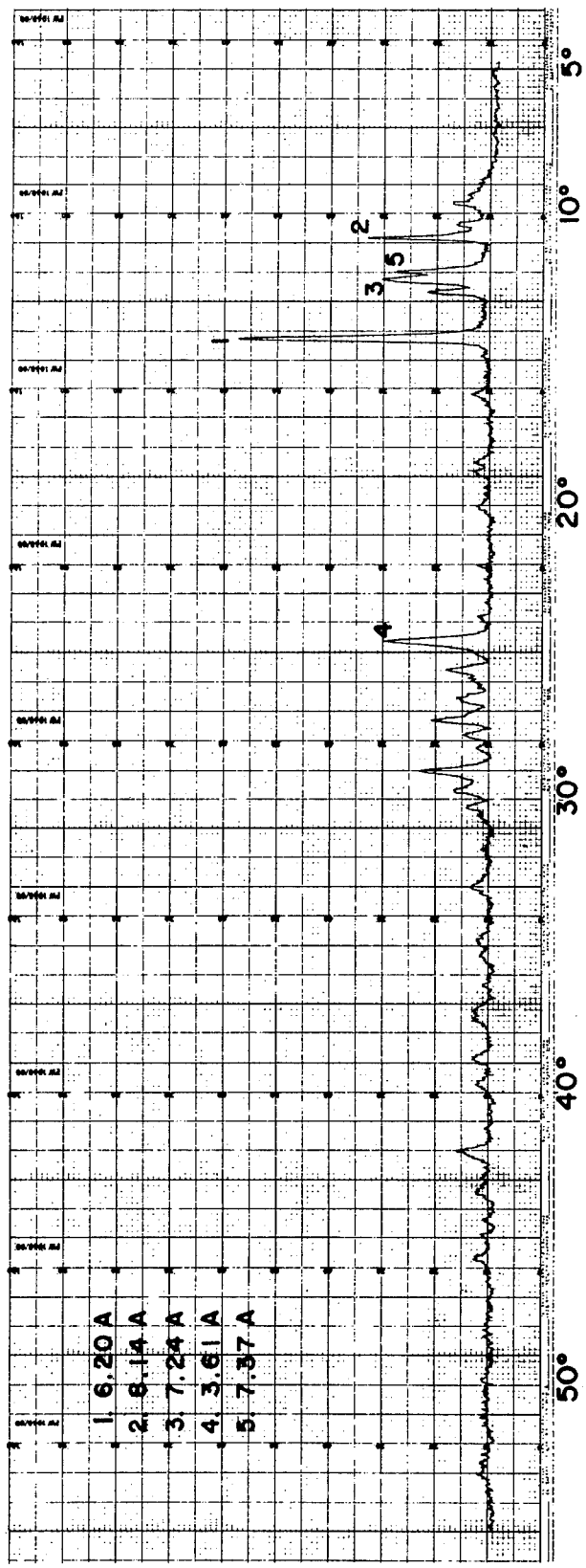

The invention will now be further described with reference to the appended drawings in which:

FIG. 1 represents a flow sheet of the preferred process for the production of the new type of ammonium tetramolybdate of this invention; and FIG. 2 is an X-ray diffraction pattern analysis of a representative sample of the obtained new product.

As illustrated in FIG. 1, a technical grade of $MoO_3$ which typically contains 84 to 90 percent $MoO_3$ with gangue impurities consisting mainly of silica, iron and copper compounds, is first subjected to ammonia leach at 1, preferably with controlled introduction of air in order to transform any ferrous iron present into ferric iron. The residue from the ammonia leach 1 is separated at 2 by passing through a filter. This residue may then be washed with purified water and the wash filtrate returned to the next ammonia leach at 1.

The filtrate from the ammonia leach is acidified at 3 to a pH of 1.5–2.5. This acidification is carried out at a temperature up to about 75°C and preferably between 25° and 75°C through the introduction of a mineral acid and with agitation of the filtrate. The obtained precipitate is separated at 4 by filtration to form a granular ammonium tetramolybdate product 5. The filter cake at 4 can again be washed with purified water and the wash filtrate may be recycled back to the acidification stage at 3 while the primary acid filtrate is discarded.

The granular ammonium tetramolybdate product 5 is unstable and should be separated from the acid solution as quickly as possible after its formation and then subjected to drying at 6, at a temperature of between 50° and 280°C, as soon as it is separated from the acid solution and washed. The drying operation at 6 will transform the granular unstable ammonium tetramolybdate product into the new fine powdered ammonium tetramolybdate of the present invention normally with a particle size of between 2 and $5\mu$. There should be no undue delays in the separation of the product 5 which is initially precipitated at 3, separated and washed at 4 and dried at 6, because this product 5 is rather unstable and if it is left unattended, at least a portion thereof may transform itself into a different form of ammonium tetramolybdate which would be too fine for many applications and which will no longer produce the new ammonium tetramolybdate product 7. However, as already mentioned above, if only a minor proportion of the product 5 is so transformed into another form of ammonium tetramolybdate, it will not adversely affect the final product.

This final fine-powdered ammonium tetramolybdate product 7, which normally has a particle size of between 2 and $5\mu$, can be readily transformed into pure $MoO_3$ powder generally of the same particle size and having a purity generally above 99.9 percent. This transformation is carried out at 8 by simply heating the new product in air at a temperature above 400°C. Actually, it is believed that this transformation is carried out in two stages through the intermediate formation of ammonium dodecamolybdate, as follows:

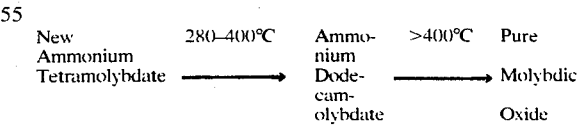

New Ammonium Tetramolybdate —280–400°C→ Ammonium Dodecamolybdate —>400°C→ Pure Molybdic Oxide Thus, according to the thermal decomposition mechanism of the new powdered ammonium tetramolybdate product, it will first decompose to ammonium dodecamolybdate starting with temperatures of about 280°–300°C, which will then decompose into pure molybdic oxide at temperatures above about 400°C.

Furthermore, the new ammonium tetramolybdate 7 can be transformed into pure high quality molybdenum powder. This transformation is carried out by heating the new product in hydrogen at a temperature above 800°C.

The new fine-powdered ammonium tetramolybdate 7 can therefore be readily transformed either into pure $MoO_3$ or pure high quality molybdenum metal powder which are important commercial molybdenum products.

In view of its good stability and easy transformation into pure $MoO_3$ or pure Mo powder, the new ammonium tetramolybdate thus becomes a highly marketable product which will be used as a starting material for the preparation of either pure $MoO_3$ or pure molybdenum metal powder or both. The actual X-ray diffraction pattern of a representative sample of this new ammonium tetramolybdate, as obtained by a Difractometer (Flat Powder) Method using CuKα as source of radiation, with nickel filter at 40 KV and 20 mA is illustrated in FIG. 2 of the drawings with the difractometer angle $2\theta$ as abscissa and the relative intensities I/I' as ordinate. The angle $2\theta$ is, of course, easily converted into dA.

The following example will further illustrate the invention without limiting the same:

EXAMPLE

Various samples of Endako technical grade molybdic oxide were charged to an ammonium hydroxide solution of a strength of 83 gpl $NH_3$ in a 1.5 liter baffled stainless steel beaker. Agitation at 630 rpm was provided by an overhead stirrer with a 2-inch diameter stainless steel turbine. Total charge weight was 1400 g. The heat of reaction served to bring the temperature to 55°C within 2–3 minutes of charging. Air was blown into the slurry at 1 liter per minute during leaching to oxidize ferrous iron to ferric. The leach was carried out with 27 percent solids at 55°C with a mole ratio of $NH_3/Mo = 2.2$. A leach time of fifteen minutes has been found to be sufficient. Following the leach, the slurry was filtered, and the wet cake washed on the filter with 200 ml. of distilled water. The primary filtrate was sent to precipitation while the wash solution was recycled to the next ammonia leach. The residue was dried, weighed and analyzed for molybdenum.

Molybdenum extractions of 99.3 percent were obtained to yield a solution containing 210 gpl/Mo and 2 – 8 gpl $NH_3$ together with ammonia soluble impurities such as copper, magnesium, calcium and aluminum compounds originally present in the technical oxide.

The filtered ammonium molybdate solution was sufficiently pure that no further purification steps have been found necessary, although it is recognized that such measures could be introduced at this stage when processing a particularly impure molybdic oxide.

The primary ammonium molybdate solution (approx. 210 gpl Mo) is usually combined with recycled wash water from previous precipitation before it is sent to the precipitation stage. The precipitation stage in the production of ammonium tetramolybdate according to this invention determines the suitability of the product with respect to both physical and chemical specifications, and also incurs the largest reagent costs. This precipitation was effected by adding an acid, such as nitric, hydrochloric or sulfuric acid, at a controlled rate to the agitated ammonium molybdate solution at 25°–75°C until a final pH of, in this particular case, 1.7. Thus, one litre quantities of combined primary ammonium molybdate solution and recycled wash solution (140–160 gpl Mo, 17–22 gpl $NH_3$, 2–10 mgpl Al, 25–30 mgpl Mg, 35–40 mgpl Ca, 50–60 mgpl Cu) were agitated in a baffled stainless steel beaker at a temperature of about 25°C, while acid was added rapidly to lower the pH to 3, followed by a more slower addition of acid to obtain the final pH of 1.7. This modification in the rate of addition is merely for convenience purposes since at a lower pH the change in pH is rather rapid and a slower rate should normally be used. The acidification step is exothermic so that a precipitation started at room temperature or 25°C finishes at 50° to 65°C if no cooling is employed. Following the final pH adjustment, the precipitated slurry was stirred for an additional 20 minutes and filtered. The ammonium tetramolybdate precipitate obtained was analyzed for the impurities present therein.

The following Table I illustrates the effect of acid employed for precipitation.

TABLE I

| Acid Type | Acid Concentration, gpl | % Mo Ppt'd. | Acid Consumption lb.Acid*/lb. Mo Ppt'd. $NH_3$ + Mo | Mo only** |
|---|---|---|---|---|
| $HNO_3$ | 1000 | 98.7 | 1.4–1.6 | 1.1 |
| HCl | 445 | 98.9 | 0.8–0.9 | 0.65 |
| $H_2SO_4$ | 885 | 93.1 | 1.7 | 1.4 |

*100% basis
**Corrected for acid consumed by free ammonia

The results obtained illustrate the suitability of various acids and show that there is an economic advantage to be gained by using hydrochloric acid or nitric acid instead of sulfuric acid.

The following Table II shows the effect of pH and temperature during precipitation with nitric acid.

TABLE II

| Temp. | pH | Precipitation with $HNO_3$ Product Formed | Mo Recovery % |
|---|---|---|---|
| 60 | 1.5 | Granular ammonium tetramolybdate 5 | 98 |
| 55 | 1.7 | " | 98 |
| 25 | 2.5 | " | 98 |
| 25 | 2.1 | " | 98 |
| 60 | 2.9 | Different type of product | 93 |
| 25 | 1.0 | Product unsuitable - difficult to filter | 98 |

The results obtained from this table provide a clear indication that pH values above about 2.5 and below about 1.5 produce a product which is either different from the granular ammonium tetramolybdate 5 or which is unsuitable because difficult to filter. The product which is of different type will not produce the new ammonium tetramolybdate of the present invention when it is dried between 50° and 280°C.

The resulting ammonium tetramolybdate obtained from the acid precipitation stage according to this invention is a granular product which filters very rapidly and has extremely little occluded mother liquor. Washing of this precipitate with distilled water to remove entrained mother liquor and obtain a high purity product proceeds easily. The wash filtrate (45–50 gpl Mo) can be recycled to the next precipitation stage.

The washed coarse tetramolybdate obtained in this manner was dried at 110°C to convert it to the new ammonium tetramolybdate of the present invention. This latter type of ammonium tetramolybdate is much finer than the previous one usually having an average particle size of between 2 and 5µ as measured with the Fisher Sub-Sieve Sizer. It should be recognized, and this has been demonstrated during the experimental work, that the particle size of the precipitated and dried tetramolybdate of this invention can be controlled within a predetermined range by regulating the precipitation variables, such as the precipitation temperature, the molybdenum concentration, the time used for filtration of the granular product and the drying temperature. The man of the art will arrive at the preferred particle size by adjusting these variables in a predetermined manner. With the specific conditions of this example, a particle size of between 2.2 and 2.4µ was obtained.

The following Table III shows the effect of precipitation conditions on product physical characteristics when precipitation was carried with nitric and hydrochloric acids.

the best features of a high purity and best particle size properties which make it particularly attractive in its transformation into pure molybdic oxide or pure molybdenum powder by suitable thermal decomposition treatment.

The invention provides therefore an important advance in the art of molybdenum technology.

What is claimed is:

1. A new fine-powdered form of ammonium tetramolybdate having an average particle size of up to about 5µ and having 60.65 percent ± 0.05 percent by weight of Mo and 5.6 percent ± 0.1 percent by weight of ammonia calculated as $NH_4^+$, the remainder being oxygen, water of hydration and incidential impurities, and an X-ray diffraction pattern with peaks, by order of importance, at 6.20 Angstroms, 8.14 Angstroms, 7.24 Angstroms, 3.61 Angstroms, and 7.37 Angstroms.

2. Ammonium tetramolybdate according to claim 1, which has an average particle size of between about 2

TABLE III

| Test No. | Mo Conc. gpl | Type and Conc. M | Acid Conditions Rate of Addition | | Final pH. | Agitation r.p.m. | Initial Soln. Temp. C° | Product Properties | | F.S.S.S.** No., µ |
|---|---|---|---|---|---|---|---|---|---|---|
| | | | 1st Stage ml/min. | 2nd Stage ml/min. | | | | Density, g/c.c. | | |
| | | | | | | | | Bulk | Tap | |
| 1 | 160 | 15.8 HNO₃ | 50 | 10 | 1.7 | 630 | 25 | 0.72 | 1.30 | 1.91 |
| 2 | 160 | 15.8 HNO₃ | 50 | 10 | 1.7 | 630 | 50 | 0.85 | 1.51 | 2.40 |
| 3 | 160 | 15.8 HNO₃ | 50 | 10 | 2.5 | 630 | 25 | 0.80 | 1.41 | 2.10 |
| 4 | 160 | 15.8 HNO₃ | 50 | 10 | 2.5 | 630 | 50 | 0.80 | 1.45 | 2.23 |
| 5 | 160 | 7.9 HNO₃ | 50 | 10 | 2.5 | 630 | 50 | 0.86 | 1.53 | 2.24 |
| 6* | 160 | 12.2 HCl | 75 | 15 | 2.5 | 630 | 25 | 0.78 | 1.37 | 2.29 |
| 7* | 160 | 12.2 HCl | 75 | 15 | 2.5 | 630 | 50 | 0.88 | 1.53 | 2.82 |
| 8 | 160 | 7.9 HNO₃ | 50 | 10 | 1.7 | 630 | 75 | 0.80 | 1.40 | 2.45 |
| 9 | 200 | 15.8 HNO₃ | 50 | 10 | 2.5 | 630 | 50 | 0.78 | 1.42 | 2.12 |
| 10 | 100 | 15.8 HNO₃ | 50 | 10 | 2.5 | 630 | 50 | 0.93 | 1.60 | 2.60 |
| 11 | 160 | 7.9 HNO₃ | 50 | 10 | 2.5 | 900 | 50 | 0.80 | 1.55 | 2.30 |
| 12 | 160 | 7.9 HNO₃ | 50 | 10 | 2.5 | 450 | 50 | 0.86 | 1.59 | 2.35 |

*Performed using 1500 ml. stock solution instead of 1000 ml. as in all other tests.
**Fisher Sub-Sieve Sizer Number. Determined using 4.60 g. sample.

The data obtained from this study show that:

a. The precipitate particle size increases slightly with increasing precipitation temperature.

b. The precipitate obtained with hydrochloric acid is slightly larger than that obtained with nitric acid, all other conditions being equal.

c. The initial molybdenum concentration in solution has an effect on the precipitate particle size, more dilute solutions giving a slightly larger precipitate.

d. The final solution pH, the acid concentration, and the agitation rates over the ranges investigated do not have a significant effect on the product particle size.

It is well known that the quality of molybdenum metal powder with respect to its suitability for use in rolling, drawing and forging applications is determined by a number of factors. Successful application requires high purity starting materials with strict process control during both the hydrogen reduction stage in powder production and subsequent fabricating stages. One must also carefully control the history of the starting material and the particle size of the molybdenum metal powder. It is known, for example, that the molybdenum powder obtained from the hydrogen reduction of an ammonium molybdate or the molybdic oxide obtained by calcination of a molybdate is much different than that obtained by hydrogen reduction of sublimed molybdic oxide. The new fine powdered ammonium tetramolybdate compound of this invention encompasses and 5µ, as determined by Fisher Sub-Sieve Sizer using 4.60g of sample.

3. Ammonium tetramolybdate according to claim 2, which is in admixture with minor quantities of other ammonium tetramolybdate forms.

4. Process for the preparation of a fine-powdered ammonium tetramolybdate compound having an average particle size of up to about 5µ which comprises:
   a. subjecting technical grade molybdic oxide to ammonia leach;
   b. removing residue from the leach to obtain an ammonium molybdate solution;
   c. acidifying said solution at a temperature of up to about 75°C to a pH of about 1.5 – 2.5 to precipitate a granular ammonium tetramolybdate product having an average particle size greater than 5µ;
   d. separating said granular product from the acidified solution; and
   e. drying said granular product at a temperature of between about 50°C and 280°C to produce the fine-powdered ammonium tetramolybdate compound.

5. Process according to claim 4, wherein the ammonia leach is performed at a temperature of 50°–60°C at 25–30 percent solids and with a mole ratio of $NH_3/Mo$ of about 2.0–2.5.

6. Process according to claim 5, wherein the ammonium hydroxide solution has a strength which is at least sufficient for stoichiometric reaction with Mo values present therein.

7. Process according to claim 4, wherein the ammonia leach is performed at a temperature of about 55°C, at about 25 percent solids and with a mole ratio of $NH_3$/Mo of about 2.2.

8. Process according to claim 4, wherein the ammonia leach is carried out with injection of air in a controlled amount such as to convert ferrous iron present in solution to ferric iron.

9. Process according to claim 4, wherein the ammonia leach is carried out with addition of hydrogen peroxide in a controlled amount such as to convert ferrous iron present in solution to ferric iron but without the formation of peroxy molybdates.

10. Process according to claim 4, wherein the ammonia leach is carried out with injection of air and addition of hydrogen peroxide in controlled amounts such as to convert ferrous iron present in solution to ferric iron but without the formation of peroxy molybdates.

11. Process according to claim 4, wherein the residue is removed from the leach by filtration through a filter.

12. Process according to claim 11, wherein the residue is washed on the filter with purified water and the resulting wash water is recycled to the next ammonia leach.

13. Process according to claim 4, wherein the solution is acidified by addition of a mineral acid while agitating said solution.

14. Process according to claim 13, wherein said acid is hydrochloric acid or nitric acid.

15. Process according the claim 13, wherein the acidification is carried out to a pH of between 1.5 and 1.9.

16. Process according to claim 13, wherein the acidification is carried out to a pH of about 1.7.

17. Process according to claim 4, wherein the precipitated granular product is separated by filtration as soon as it is formed.

18. Process according to claim 17, wherein the separated product is washed with purified water to remove entrained mother liquor and the wash water is recycled to the next acidifying stage.

19. Process according to claim 4, wherein the granular product is dried immediately upon its separation at a temperature of about 110°C.

20. Process for converting ammonium tetramolybdate defined in claim 1, into high purity molybdic oxide having an average particle size of between 2 and 5$\mu$ as determined by Fisher Sub-Sieve Sizer, which comprises heating said ammonium tetramolybdate in air at a temperature in excess of 400°C without any associated dissolution or atomization of the product.

* * * * *